US008726061B2

(12) United States Patent
Poimboeuf et al.

(10) Patent No.: US 8,726,061 B2
(45) Date of Patent: *May 13, 2014

(54) SYSTEM AND METHOD FOR SYNCHRONIZING MULTIPLE MEDIA DEVICES (75) Inventors: Michael K. Poimboeuf, San Mateo, CA (US); Francis S. Bernard, Brentwood, CA (US); Kevin A. Smith, Torrance, CA (US); Parkson Wong, Los Altos, CA (US); Todd S. Stock, Palo Alto, CA (US); William R. Lawson, Reno, NV (US)

(73) Assignee: RPX Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/205,149

(22) Filed: Aug. 8, 2011

(65) Prior Publication Data
US 2012/0036388 A1 Feb. 9, 2012

Related U.S. Application Data (63) Continuation of application No. 11/102,642, filed on Apr. 11, 2005, now Pat. No. 7,996,699.

(51) Int. Cl.
G06F 1/06 (2006.01)
G06F 1/12 (2006.01)

(52) U.S. Cl.
USPC ........... 713/400; 713/500; 713/503; 713/600; 348/194; 348/500; 386/201

(58) Field of Classification Search
USPC .......... 713/400, 500, 503, 600; 348/194, 500; 386/201
See application file for complete search history.

(56) References Cited

U.S. PATENT DOCUMENTS

| 2,896,503 A | 7/1959 | Smith |
| 2,918,843 A | 12/1959 | Smith |
| 3,291,905 A | 12/1966 | Smith |
| 4,345,817 A | 8/1982 | Gwynn |

(Continued)

OTHER PUBLICATIONS

Pirazzi, Chris, "Introduction to UST and UST/MSC," Lurker's Guide http://lurkertech.com/lg/time/intro/html, last updated Mar. 1, 2002, 54 pages.

Primary Examiner — Kim Huynh
Assistant Examiner — Michael J Brown
(74) Attorney, Agent, or Firm — Howison & Arnott, L.L.P.

(57) ABSTRACT

Multiple media devices are synchronized in a multi-media system having a computer system, a plurality of media devices, and a display system. Each media device to be synchronized receives a front-end synchronization signal that periodically increments a front-end counter. The front-end counter represents an unadjusted system time (UST). The media device obtains a frame of data to be displayed from a computer system. The media device also receives a back-end synchronization signal that periodically increments a back-end counter each time a frame of data is to he displayed. The back-end counter represents a media stream count (MSC). UST and MSC data are periodically transmitted to the computer system for analysis and use by a synchronization algorithm. Specifically, UST is transmitted to the computer system each time a frame of data is obtained, and a UST/MSC pair is transmitted to the computer system each time a frame of data is displayed. The computer system executes a synchronization algorithm that uses the transmitted UST and UST/MSC pair to maintain the media devices in a synchronized state.

24 Claims, 4 Drawing Sheets

(56) References Cited

U.S. PATENT DOCUMENTS

| | | |
|---|---|---|
| 4,355,328 A | 10/1982 | Kulik |
| 4,703,439 A | 10/1987 | Lotz |
| 4,757,378 A | 7/1988 | Hackett et al. |
| 4,772,942 A | 9/1988 | Tuck |
| 4,797,836 A | 1/1989 | Witek et al. |
| 4,868,682 A | 9/1989 | Shimizu et al. |
| 4,974,073 A | 11/1990 | Inova |
| 5,113,455 A | 5/1992 | Scott |
| 5,136,390 A | 8/1992 | Inova et al. |
| 5,181,122 A | 1/1993 | Ooishi |
| 5,351,092 A | 9/1994 | Poimboeuf et al. |
| 5,452,006 A | 9/1995 | Auld |
| 5,519,444 A | 5/1996 | Ko et al. |
| 5,528,308 A | 6/1996 | Alelyunas et al. |
| 5,588,029 A | 12/1996 | Maturi et al. |
| 5,594,660 A | 1/1997 | Sung et al. |
| 5,596,369 A | 1/1997 | Chau |
| 5,598,352 A | 1/1997 | Rosenau et al. |
| 5,603,016 A | 2/1997 | Davies |
| 5,617,502 A | 4/1997 | Ort et al. |
| 5,619,255 A | 4/1997 | Booth |
| 5,621,772 A | 4/1997 | Maturi et al. |
| 5,694,332 A | 12/1997 | Maturi |
| 5,696,892 A | 12/1997 | Redmann et al. |
| 5,751,280 A | 5/1998 | Abbott et al. |
| 5,761,537 A | 6/1998 | Sturges et al. |
| 5,764,965 A * | 6/1998 | Poimboeuf et al. ........... 713/400 |
| 5,815,634 A | 9/1998 | Daum et al. |
| 5,844,562 A | 12/1998 | Harrison |
| 5,850,352 A | 12/1998 | Moezzi et al. |
| 5,877,771 A | 3/1999 | Drebin et al. |
| 5,889,529 A | 3/1999 | Jones et al. |
| 5,905,768 A | 5/1999 | Maturi et al. |
| 5,907,685 A | 5/1999 | Douceur |
| 5,973,679 A | 10/1999 | Abbott et al. |
| 5,973,701 A | 10/1999 | Vaswani |
| 5,977,977 A | 11/1999 | Kajiya et al. |
| 5,982,373 A | 11/1999 | Inman et al. |
| 5,982,830 A | 11/1999 | Maturi et al. |
| 6,016,166 A | 1/2000 | Huang et al. |
| 6,061,802 A | 5/2000 | Gulick |
| 6,067,411 A | 5/2000 | Poimboeuf et al. |
| 6,101,221 A | 8/2000 | Varanasi et al. |
| 6,104,416 A | 8/2000 | McGuinness |
| 6,122,316 A | 9/2000 | Varanasi et al. |
| 6,124,894 A | 9/2000 | Greenwood et al. |
| 6,124,895 A | 9/2000 | Fielder |
| 6,141,062 A | 10/2000 | Hall et al. |
| 6,147,695 A | 11/2000 | Bowen et al. |
| 6,181,383 B1 | 1/2001 | Fox et al. |
| 7,561,559 B2 | 7/2009 | Hannel et al. |
| 7,669,113 B1 | 2/2010 | Moore et al. |
| 7,996,699 B2 * | 8/2011 | Poimboeuf et al. ........... 713/400 |
| 2002/0089489 A1 * | 7/2002 | Carpenter ................ 345/158 |
| 2002/0095613 A1 * | 7/2002 | Matsuoka et al. ............ 713/400 |

* cited by examiner

SYSTEM AND METHOD FOR SYNCHRONIZING MULTIPLE MEDIA DEVICES

This application is a continuation of U.S. patent application Ser. No. 11/102,642, filed Apr. 11, 2005, now allowed of which is incorporated herein by reference in its entirety.

BACKGROUND OF THE INVENTION

1. Field of the Invention

The invention relates to synchronizing multiple media streams to achieve an integrated output.

2. Background Art

Digital technology has made great progress in recent years. One potable expansion of digital technology has been in the home entertainment industry. Indeed, digital technology is now ubiquitous in modern homes, Common digital devices include DVD and CD players and burners, personal computers, digital cameras and camcorders, video game consoles, digital cell phones, and even digital video recorders. Great strides are also being made in the realm of digital cinema, as image resolution continues to improve and approach that of traditional film technology. For example, numerous upcoming major motion pictures will be shot entirely on digital video, and will play mainly on digital movie projectors.

There are many advantages to digital technology. For instance, digital mediums can store, transmit and retrieve enormous amounts of information exactly as it was originally recorded. Analog technology, on the other hand, is more difficult to access, and generally degrades with each viewing. Additionally, digital information is far more flexible than analog technology. A computer can easily manipulate digital bytes of data, while manipulation of analog information requires more laborious traditional methods.

One continuing challenge of digital technology is image resolution. As noted above, only very recently has digital video begun to approach the image quality of traditional film. Another continuing challenge is that, with the rapid growth of digital technology, there are many different standards controlling image resolution. One only need to shop for a modern television to see a variety of different image resolutions such as 720×480 in interlaced format, 1280×720 in progressive format, and 1920×1080 in both interlaced and progressive formats.

What is needed is the ability to combine similar or disparate sources of digital information, perhaps with differing resolutions, to achieve an integrated output of desired resolution and quality. Such an invention could increase the flexibility of existing technology, or could increase bandwidth in existing technology to achieve ever finer resolutions. One common hurdle to combining multiple media streams lies in synchronizing the media devices used to process and display digital information. The present invention is directed to improvements in synchronization systems and methods.

BRIEF SUMMARY OF THE INVENTION

Additional features and advantages of the invention will be set forth in the description that follows, and in part will be apparent from the description, or may be learned by practice of the invention.

An embodiment of the invention is directed to a method for synchronizing multiple media devices in a multi-media system having a computer system, a plurality of media devices, and a display system. Each media device to be synchronized receives a front-end synchronization signal that periodically increments a front-end counter. The front-end counter represents an unadjusted system time (UST). Each media device also receives from a display system a back-end synchronization signal that periodically increments a back-end counter each time a frame of data is displayed. The back-end counter represents a media stream count (MSC). UST and MSC data are periodically transmitted to the computer system for analysis and use by a synchronization algorithm. Specifically, UST is transmitted to the computer system each time a frame of data is obtained, and a UST/MSC pair is transmitted to the computer system each time a frame of data is displayed. The computer system executes a synchronization algorithm that uses the transmitted UST and UST/MSC pair to maintain the media devices in a synchronized state.

An embodiment of the invention is also directed to a synchronizable media device for use in a multi-media system. The media device comprises a media data pipeline that obtains media data from a computer system and prepares the media data for display on a display system. The media device includes a storage buffer coupled to the media data pipeline that stores prepared media data prior to display on the display system. The media device also includes two counters that generate synchronization data. A front-end counter is coupled to the media data pipeline. The front-end counter receives a front-end synchronization signal to generate a uniform, monotonically increasing timeline. The timeline corresponds to UST. A back-end counter is coupled to the front-end counter. The back-end counter receives a back-end synchronization signal to generate a sequential count of data that is displayed on the display system. The sequential count of data corresponds to a MSC. The media device further includes means for transmitting UST to the computer system whenever the media data pipeline obtains media data. The media device also includes means for transmitting a timestamp pair of data comprising MSC and a corresponding UST to the computer system. The storage buffer may receive a buffer control signal from the computer system that controls the contents of the storage buffer to correct synchronization errors in the media device.

It is to be understood that both the foregoing general description and the following detailed description are exemplary and explanatory and are intended to provide further explanation of the invention as claimed. Neither the Summary of the Invention nor the Detailed Description are intended to limit the scope of the invention beyond what is claimed.

BRIEF DESCRIPTION OF THE DRAWINGS/FIGURES

The accompanying drawings, which are included to provide a further understanding of the invention and are incorporated in and constitute part of this specification, illustrate embodiments of the invention. Together with the description, they serve to provide examples of implementation of the invention. In the drawings.

The present invention will now be described with reference to the accompanying drawings. In the drawings, like reference numbers indicate identical or functionally similar elements. Additionally, the leftmost digit of a reference number identifies the figure in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments that fall within the scope of the claims, and additional fields in which the invention would be of significant utility.

The present invention is generally directed to a system and method for synchronizing a plurality of media devices such that their output may be combined to form a single integrated output. In an embodiment, such an invention may increase the bandwidth of existing multi-media technology so that it can support, for example, digital cinema requirements.

Figure 1:
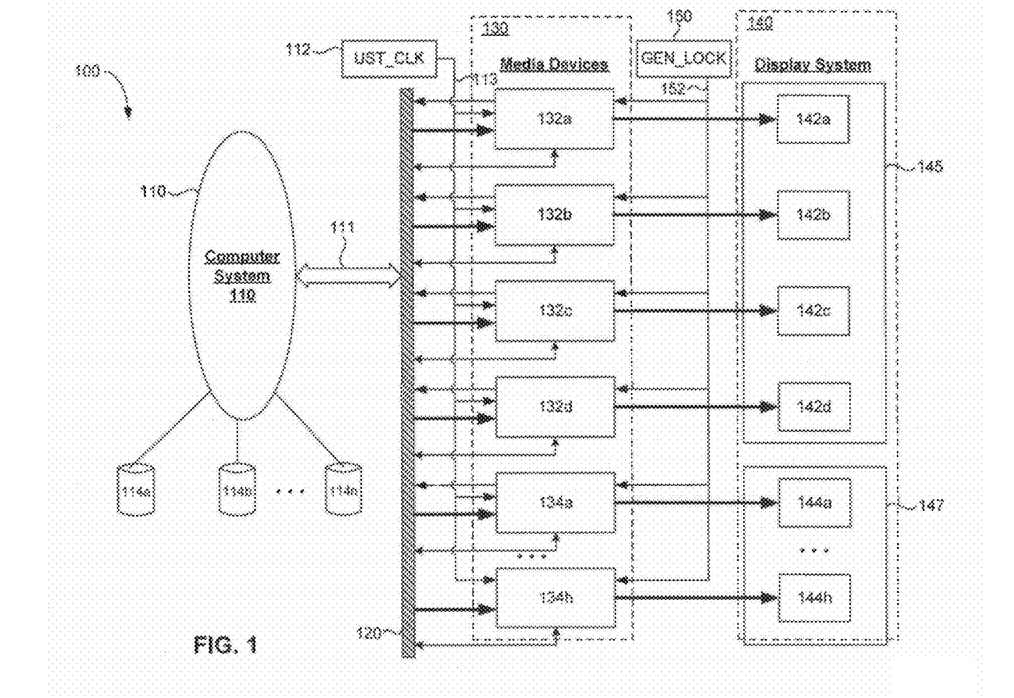
FIG. 1 illustrates an operating environment of the present invention.

FIG. 1 illustrates an exemplary multimedia system 100 in which an embodiment of the present invention may operate. Multimedia system 100 typically comprises a computer system 110, a plurality of media devices 130, and a display system 140. Computer system 110 is coupled to the plurality of media devices 130 by a front-end bus 120. The plurality of media devices 130 are coupled to a multiple-input display system 140. Multimedia system 100 also preferably includes two reference clocks. In the embodiment shown in FIG. 1, these clocks represented by an unadjusted system time clock (UST_CLK) 112, and a generator lock (GEN_LOCK) clock 150. Each of the components of multimedia system 100 are described more fully below.

Computer system 110 may consist of a single computer system, or a number of aggregated computer systems, or even a cluster of loosely connected computer systems that operate together to produce a system output 111. Computer system 110 is coupled to a plurality of databases 114a through 114n. These databases may contain video, graphical, audio or other types of sensory data (e.g., data controlling motion or vibration for an interactive video game). The databases may comprise any storage mechanism such as disk drives, storage networks or even fast network connections. System output 111 may comprise, alone or in any combination, the data available to computer system 110 via databases 114a-114n. Depending on the composition of output 111, the data is routed to one or more of the plurality of media devices 130.

The plurality of media devices 130 could include media devices such as graphics processing units or graphics cards, video cards, audio cards, MIDI cards or any other device designed to prepare system output 110 for display to a user. As noted above, media devices 130 are coupled to computer system through front-end bus 120, using known standards. For example, referring to FIG. 1, if media devices 132a through 132d were graphics cards, then graphical data would be routed to media devices 132a through 132d, as determined by applications running on computer system 110. Similarly, if media devices 134a through 134h were audio cards, then audio data would be routed to these media devices.

For the purpose of this description, media devices 130 are considered to have a "front end" and a "back end." The front end of an exemplary media device 130 is considered to be the portion of the device that is coupled to front-end bus 120, and that receives system output 111 from computer system 110. The back end of media devices 130 is considered to be the portion of the media device that is coupled to display system 140.

Display system 140 may include a variety of separate displays. For example, display system 140 may include a visual display 145 (e.g., video projector, or CRT screen) and an audio monitor 147 (e.g., speakers). In an embodiment of the invention, display system 140 has a plurality of inputs for receiving data to be displayed from the plurality of media devices 130. As illustrated in FIG. 1, if media devices 132a through 132d were graphics cards or video cards, then they would be coupled to visual display devices 142a-142d. Similarly, if media devices 134a through 134h were audio cards, then they would be coupled to audio monitor devices 144a-144h.

As noted above, multimedia system 100 also has two separate reference clocks. The first reference clock, UST_CLK 112, is an isochronous master clock that provides a front-end synchronization signal (FE_SYNCH) 113 that corresponds to an unadjusted system time (UST). The second reference clock, GEN_LOCK clock 150, provides a back-end synchronization signal (BE_SYNCH) 152 to each of the media devices 130. GEN_LOCK clock 150 ensures that the output of various media devices 130 remains synchronized. For example, and as explained in more detail below, GEN_LOCK clock ensures that media devices 132a-132d send a frame of graphics data to display devices 142a-142d at the same time.

Figure 2:
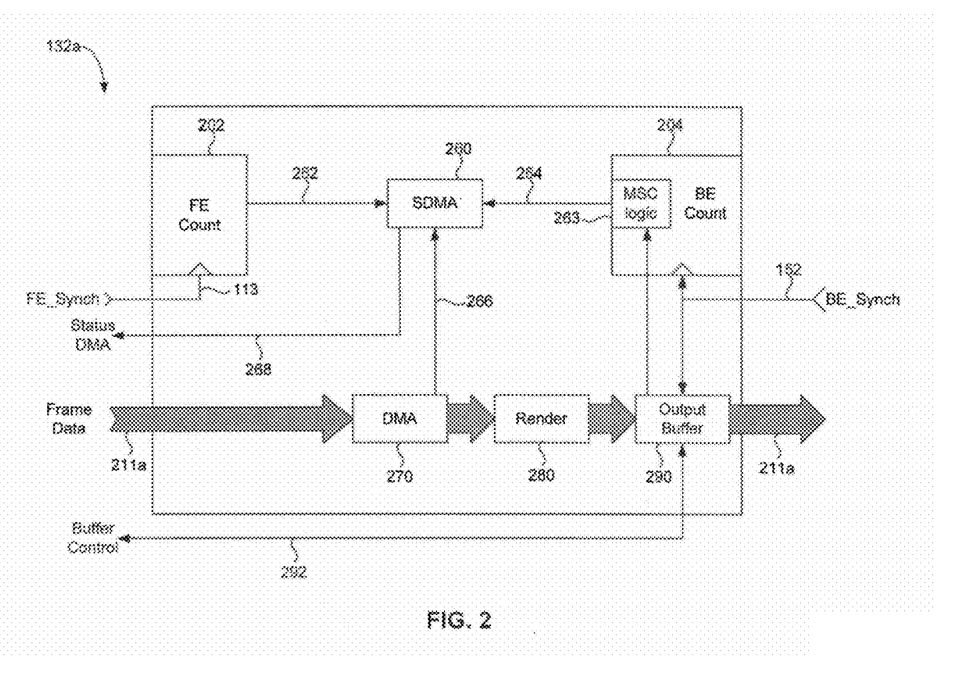
FIG. 2 more specifically illustrates an exemplary media device, such as a graphics card.

As noted above, the present invention is directed to a system and method for ensuring that the plurality of media devices 130 remain synchronized as they receive data in various formats from computer system 110, and subsequently prepare the data for an integrated display on display system 140. FIG. 2 more specifically illustrates an exemplary media device. For illustrative purposes, the media device is an exemplary graphics card 132a having a media data pipeline for acquiring, rendering, and storing graphical data for ultimate display on a corresponding portion of visual display 145—e.g., visual display device 142a.

In FIG. 2, the exemplary graphics card 132a uses a direct media access (DMA) controller 270 to obtain frames of graphics data 211a from computer system 110. Generally, DMA controller 270 allows peripheral devices, such as media devices 130, to directly transfer data from databases 114a through 114n, with minimal involvement of processors (not shown) in computer system 110. Referring again to FIG. 2, graphical frames of data 211a enter media device 132a via DMA controller 270 and are then sent to a rendering pipeline 280. There, graphical data frame 211a is rendered and prepared for display. In a typical graphics card, rendering involves the conversion of primitives in object coordinates, to fragments or pixels representing the image to be displayed.

When the rendering is complete, graphical data frame 211a is temporarily stored in an output buffer 290. In an embodiment, output buffer 290 is a first-in-first-out (FIFO) buffer. Additionally, there may more than one output buffer in any given media device, depending on its memory needs. In an embodiment, and as explained more fully below, output buffers 290 are multipurpose buffers that allow the computer system to correct perceived errors in synchronization amongst the plurality of media devices 130. Computer system 110 can cause output buffers 290 to either skip or repeat frames, as necessary, to correct synchronization errors amongst the plurality of media devices 130. A synchronization algorithm running on computer system 110 uses buffer control signal 292 to achieve this functionality. Output buffer 290 also receives a BE_SYNCH signal 152 from GEN_LOCK clock 150. The BE_SYNCH signal, which is received by each of the plurality of media devices 130, tells the output buffers when to send the next sequential frame of data to display devices 140. The rendered graphics data frame (e.g., frame 211a) is then sent to a corresponding portion (e.g., visual display device 142a) of visual display 145 for display to a user.

The above description illustrates the media data pipeline in which frames of media data to be displayed flow through an exemplary media device, such as graphics card 132a. This simplified media data pipeline is for illustrative purposes only and should not be construed as limiting. Other data acquisition protocols may be employed, and other types of data manipulation may occur. As noted above, it is important that the plurality of media devices 130 be synchronized as they display media data in an integrated system output. To this end, media devices 130 contain means for collecting and transmitting synchronization data to computer system 110. As explained more fully below, the synchronization data enables an algorithm running on computer system 110 to control and synchronize the media devices 130.

Still referring to FIG. 2, exemplary graphics card 132a contains components and leverages certain protocols to collect synchronization data and transmit it to computer system 110. This is achieved primarily through a front-end counter 202, a back-end counter 204, and a status DMA (SDMA) controller 260. Generally, the two counters track and collect synchronization data, while SDMA periodically transmits the synchronization data to computer system 110. The collection and transmission of the synchronization data is described more fully below.

Front-end counter 202 is periodically incremented by FE_SYNCH 113. At any given time, the value of front-end counter 202 represents an unadjusted system time (UST), which is simply a uniform, monotonically increasing timeline. If the system is properly initialized, UST will be substantially identical for each of media devices 130 as an application runs on computer system 110. UST thus represents a common synchronization reference for media devices 130. Each time a frame completes—i.e., DMA. 270 is implemented—SDMA 260 relays the value of UST 262 to computer system 110. Computer system 110 thus knows, in terms of UST 262, when a frame of data enters each media device.

Back-end counter 204 is driven, in this exemplary embodiment, by the periodic BE_SYNCH signal 152. Generally, BE_SYNCH 152 is provided to each of the plurality of media devices 130 by GEN_LOCK clock 150. GEN_LOCK clock 150 outputs BE_SYNCH whenever a frame of data is to be displayed by the corresponding display device 142a. Back-end counter 204 increments each time a BE_SYNCH 152 is received. Back-end counter 204 thus maintains a sequential count of displayed frames of media data. In this exemplary embodiment, a particular value, of a back-end counter 204 is thus referred to as a media stream count (MSC).

BE_SYNCH 152 is also received by output buffer 290. The BE_SYNCH signal 152 tells the output buffer 290 to send the next sequential frame of data to a corresponding display device. Each time back-end counter 204 increments (i.e., a frame of data is displayed on a corresponding display device), MSC 264 is transmitted to SDMA 260. This is accomplished by MSC logic 263, which snaps the MSC value each time the output buffer 290 indicates that it has sent a frame of data to its corresponding display device. SDMA 260 then obtains a corresponding UST value 262, and relays the UST/MSC pair to computer system 110. The UST/MSC pair, also referred to a "timestamp pair," thus identifies each frame of data that is displayed in terms of both UST and a corresponding MSC value.

In sum, front-end counter 202 represents or corresponds to an unadjusted system time (UST), while back-end counter 204 represents or corresponds to a media stream count (MSC). SDMA 260 (i) relays UST 262 to computer system 110 each time a DMA 270 occurs, and (ii) relays timestamp pair (UST 262/MSC 264) to computer system 110 each time output buffer 290 indicates to MSC logic 263 that a frame of data has been transmitted for display. In this fashion, SDMA 260 transmits the synchronization data to computer system 110.

Computer system 110 executes a synchronization algorithm. With this synchronization data, the synchronization algorithm can determine, for each media device, whether the media device is synchronized with all the other media devices. For instance, if a DMA 270 does not complete for a particular device, the synchronization algorithm will note a missing UST 262. On the other hand, if a frame does not display on the corresponding display device, then the synchronization algorithm will note a discrepancy in subsequent (UST/MSC) timestamp pairs. If a media device becomes out of synch, either by not completing a DMA 270 with all the other devices, or by not sending a frame of data to be displayed along with the all the other devices, then computer system 110, through buffer control signal 292, can cause individual output buffers on the media devices to either repeat or skip frames of data until the synchronization error is resolved.

It is important to note at this point that the collection of synchronization data (i.e., UST and UST/MSC pair) and its transmission to computer system 110 has been accomplished using well known DMA and SDMA protocols. The invention is not limited to this exemplary embodiment. One of skill in the art could conceive of other means to collect and transmit the synchronization data, for example, using memory registers and an alternate data transmission protocol. Use of DMA and SDMA protocols merely allows one implementing the invention to leverage existing functionality and protocols.

Figure 3:
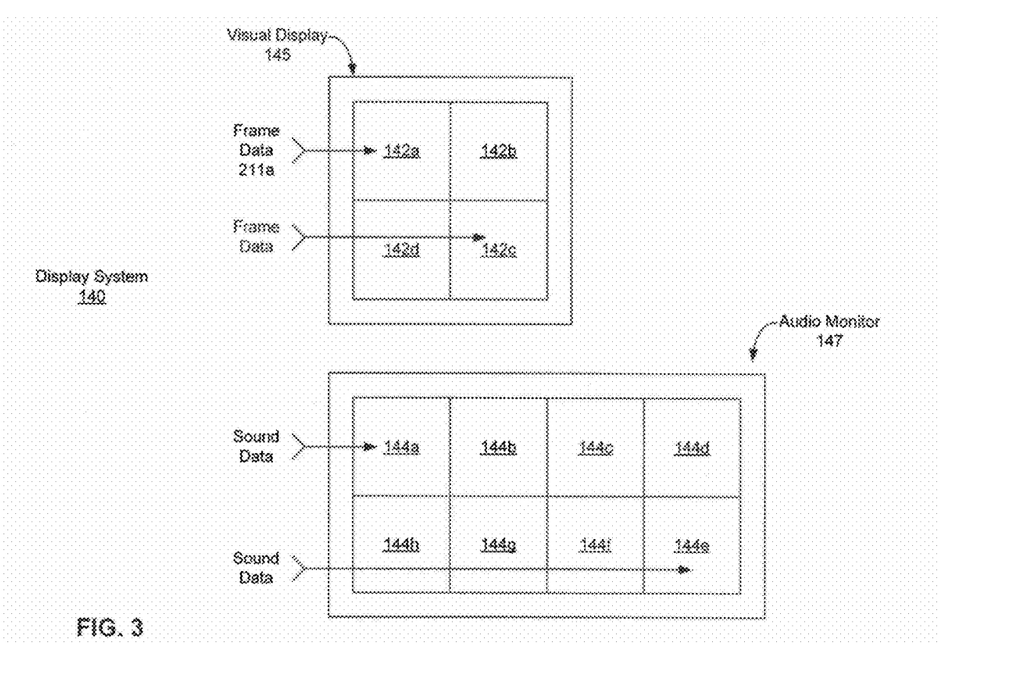
FIG. 3 more specifically illustrates an exemplary display system.

FIG. 3 more specifically illustrates an exemplary display system 140. In the embodiment shown, visual display 145 has four inputs (not all shown) that, in an embodiment, receive graphical data from the four exemplary graphics cards 132a-132d (not shown in FIG. 3). Thus, each media device 132a-132d provides graphical frame data to a corresponding visual display device 142a-142d. Generally, a visual display device can be an individual display such as a CRT display or a projection screen, or a specified portion thereof. In the exemplary embodiment of FIG. 3, display device 142a covers the upper left portion of visual display 145, while display device 142b covers the upper right portion of visual display 145, and so on. Display system 140 may also include an audio monitor 147. In an embodiment, audio monitor 147 receives eight separate channels of audio data into audio devices 144a through 144h. It should be noted that, for clarity, not all data transmission lines have been illustrated in FIG. 3.

The above description relates to the physical components of an exemplary display system in which the claimed invention may be implemented. Other display systems could be envisioned by a skilled artisan. For example, the display system is not limited to visual and audio displays. A display system could incorporate other sensory inputs, such as motion, temperature, aroma, etc.

Figure 4:
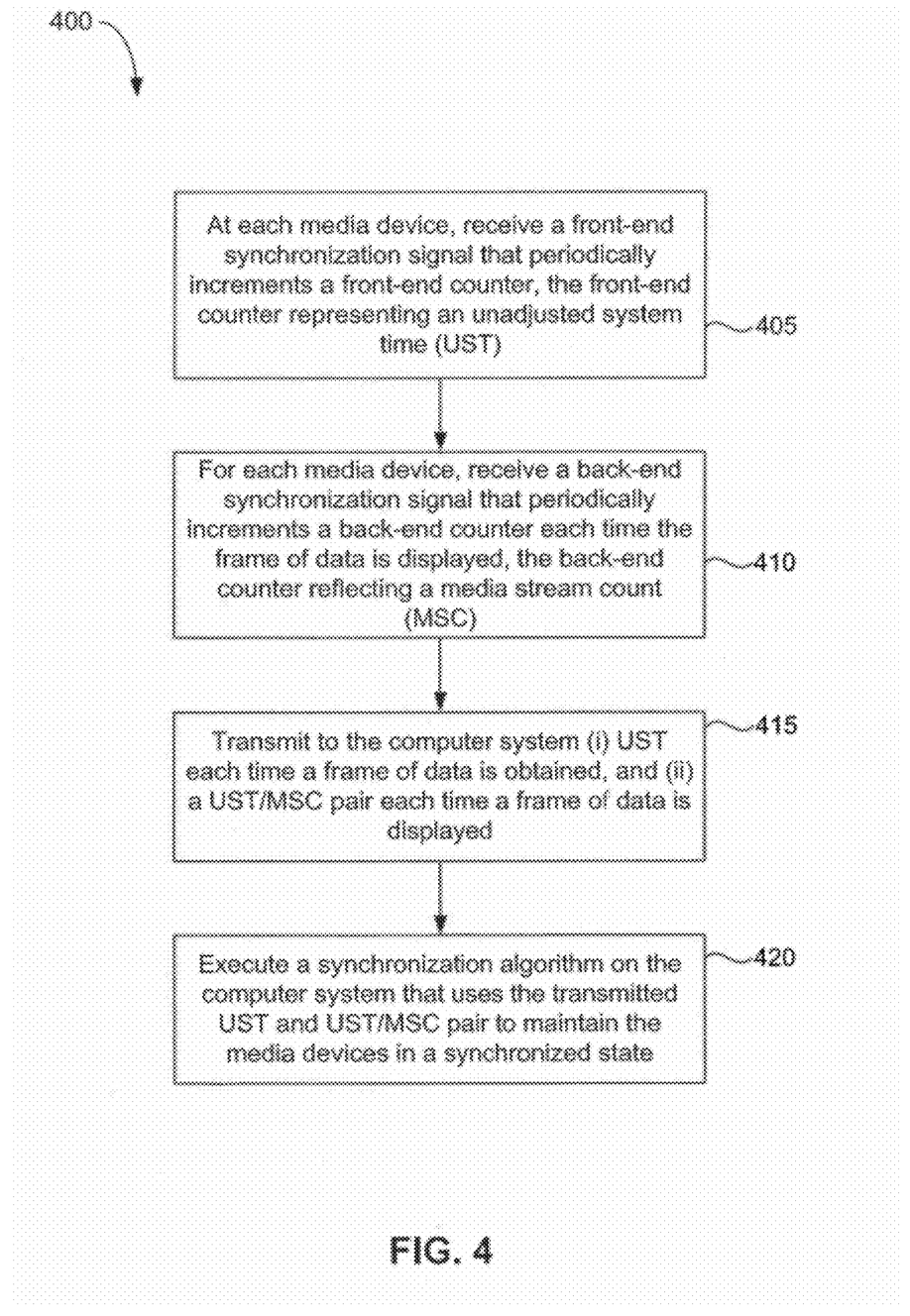
FIG. 4 is a flow chart illustrating an exemplary method according to the present invention.

FIG. 4 is a flow chart illustrating an exemplary method 400 of carrying out an embodiment of the present invention. As noted above, exemplary multimedia system 100 comprises a computer system 110, a display system 140, and a plurality of media devices 130. An embodiment of the present invention provides a method 400 for maintaining the plurality of media devices 130 in a synchronized state while they work together to provide an integrated output for display on display system 140.

In step 405, each media device receives a front-end synchronization signal (FE_SYNCH) that periodically increments a front-end counter. The front-end counter represents an unadjusted system time (UST). As noted above, UST represents a uniform, monotonically increasing timeline. If the multimedia system is properly initialized, UST will be identical for each of media devices 130 as an application runs computer system 110. UST thus represents a common synchronization reference for each media device.

As illustrated in step 410, the media device also receives a back-end synchronization signal (BE_SYNCH) that periodically increments a back-end counter each time the BE_SYNCH signal indicates that a frame of data is to be displayed. The back-end counter thus maintains a sequential count of displayed frames of media data. In an exemplary embodiment, a particular value of a back-end counter is represented by the media stream count (MSC).

UST and MSC thus represent synchronization data that is periodically transmitted to the computer system for analysis and use by a synchronization algorithm. As illustrated in step 415, UST is transmitted to the computer system each time a frame of data is obtained by the media device. As noted above, a synchronization algorithm running on computer system 110 thus knows, in terms of UST, when a frame of data enters each media device. Additionally, according to step 415, a UST/MSC pair is transmitted to the computer system each time a frame of data is displayed. As noted above, the UST/MSC pair, also referred to a "timestamp pair," thus identifies each frame of data that is displayed in terms of both UST and a corresponding MSC value. In an embodiment, this synchronization data is transmitted to the computer system using SDMA protocols.

Finally, in step 420, the computer system executes a synchronization algorithm that uses the transmitted UST and UST/MSC pair to maintain the media devices in a synchronized state. This is functionally achieved through the use of output buffers on the media devices, and a buffer control signal. As described above, the synchronization algorithm running on the computer system can cause individual output buffers on the media devices to either repeat or skip frames of data to resolve any synchronization errors that may occur.

EXAMPLE

A working exemplary environment is provided by way of example, not limitation. The features of this invention can be used to drive a 4K Digital Cinema projector display system such as Sony's 10,000 ANSI lumen model (SRX-R110) or its 5,000 ANSI lumen model (SRX-R105). Because the technology does not yet exist to drive a 4K×2160 digital projector display system at 24 frames/sec (fps) with a single interface, multiple high definition (HD) streams (e.g., formatted according to SMPTE 292M LID standard) can be combined and synchronized to provide a single 4K×2160 uncompressed sequence for the Digital Cinema projector display system. In this example, the original 4K×2160 images may be segmented into 4 quadrants (each 2048×1080) and stored on disk, or another such database. In addition to video, audio (10 channels) and subtitling data may he stored on disk, or other storage medium, in an efficient format for output. During playout, the streams are read from the disk and sent to four separate HD video output display devices, each of which convert the data to SMPTE 292M HP serial data (e.g., 2048× 1080 at 24 fps). As the data is transferred to the genlocked video display devices, the underlining UST/MSC synchronization system of the present invention may be employed to start the streams together and maintain synchronization. Each HD output stream is connected to the Digital Cinema projector display system, which is responsible for final compositing into a single 4K image sequence. Along with video, synchronized audio is decoded, amplified and sent to speakers on the audio monitor. In addition any metadata associated with the content may be delivered to an appropriate device based on the underlining UST/MSC synchronization system of the present invention.

The present invention has been described above with the aid of functional building blocks and method steps that illustrate the performance of specified functions and relationships thereof The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

We claim:
1. A method comprising:
transmitting a plurality of data frames to a first media device and a second media device;
determining whether a first counter value, corresponding to a time a first data frame is obtained by the first media device, has been received from the first media device;
determining whether a second counter value, corresponding to a time a second data frame is obtained by the second media device, has been received from the second media device;
wherein the first counter value and the second counter value comprise unadjusted system time (UST);
transmitting a first synchronization signal to one or more of the first and second media devices based on a discrepancy in receipt of the first or second counter value;
receiving, from the first media device, a third counter value corresponding to a time the first data frame of the plurality of data frames is sent for output by the first media device, and a fourth counter value uniquely identifying the first data frame;
receiving, from the second media device, a fifth counter value corresponding to a time the second data frame of the plurality of data frames is sent for output by the second media device, and a sixth counter value uniquely identifying the second data frame, wherein the first and second data frames are intended for synchronized output;
wherein the third/fourth counter values and the fifth/sixth counter values comprise unadjusted system time (UST)/media stream count (MSC) pairs; and
transmitting a second synchronization signal to cause an output buffer in the one or more media devices receiving the plurality of the data frames to skip or repeat one or more data frames transmitted by the one or more media devices based on a difference between the third and fifth counter values for the first and second data frames.

2. The method of claim 1, wherein the first data frame comprises video data.

3. The method of claim 2, wherein the second data frame comprises audio data corresponding to the video data.

4. The method of claim 1, wherein receiving the third and fourth counter values from the first media device comprises receiving the first and second counter values from the first media device using status direct memory access (SDMA).

5. The method of claim 1, further comprising:
providing the first data frame to the first media device using direct memory access (DMA).

6. The method of claim 1, wherein the first and second data frames comprise portions of an original image.

7. The method of claim 6, wherein the original image is a 4 Kx2160 image segmented into quadrants, the first and second data frames corresponding to two of the quadrants.

8. A non-transitory, computer-readable storage device having instructions stored thereon, execution of which, by a computing device, causes the computing device to perform operations comprising:
transmitting a plurality of data frames to a first media device and a second media device;
determining whether a first counter value, corresponding to a time a first data frame is obtained by the first media device, has been received from the first media device;
determining whether a second counter value, corresponding to a time a second data frame is obtained by the second media device, has been received from the second media device;
wherein the first counter value and the second counter value comprise unadjusted system time (UST);
transmitting a first synchronization signal to one or more of the first and second media devices based on a discrepancy in receipt of the first or second counter value;
receiving, from the first media device, a third counter value corresponding to a time the first data frame of the plurality of data frames is sent for output by the first media device, and a fourth counter value uniquely identifying the first data frame;
receiving, from the second media device, a fifth counter value corresponding to a time the second data frame of the plurality of data frames is sent for output by the second media device, and a sixth counter value uniquely identifying the second data frame, wherein the first and second data frames are intended for synchronized output;
wherein the third/fourth counter values and the fifth/sixth counter values comprise unadjusted system time (UST)/ media stream count (MSC) pairs; and
transmitting a second synchronization signal to cause an output buffer in the one or more media devices receiving the plurality of the data frames to skip or repeat one or more data frames transmitted by the one or more media devices based on a difference between the third and fifth counter values for the first and second data frames.

9. The non-transitory computer-readable storage device of claim 8, wherein the first data frame comprises video data.

10. The non-transitory computer-readable storage device of claim 9, wherein the second data frame comprises audio data corresponding to the video data.

11. The non-transitory computer-readable storage device of claim 8, wherein receiving the third and fourth counter values from the first media device comprises receiving the third and fourth counter values from the first media device using status direct memory access (SDMA).

12. The non-transitory computer-readable storage device of claim 8, the operations further comprising:
providing the first data frame to the first media device using direct memory access (DMA).

13. The non-transitory computer-readable storage device of claim 8, wherein the first and second data frames comprise portions of an original image.

14. The non-transitory computer-readable storage device of claim 13, wherein the original image is a 4Kx2160 image segmented into quadrants, the first and second data frames corresponding to two of the quadrants.

15. A system comprising:
a front-end bus communication interface configured to:
transmit a plurality of data frames to one or more media devices;
determine whether a first counter value, corresponding to a time a first data frame is obtained by the first media device, has been received from the first media device;
determine whether a second counter value, corresponding to a time a second data frame is obtained by the second media device, has been received from the second media device;
wherein the first counter value and the second counter value comprise unadjusted system time (UST);
transmit a first synchronization signal to one or more of the first and second media devices based on a discrepancy in receipt of the first or second counter value;
receive, from the first media device, a third counter value corresponding to a time the first data frame of the plurality of data frames is sent for output by the first media device, and a fourth counter value uniquely identifying the first data frame;
receive, from the second media device, a fifth counter value corresponding to a time the second data frame of the plurality of data frames is sent for output by the second media device, and a sixth counter value uniquely identifying the second data frame, wherein the first and second data frames are intended for synchronized output;
wherein the third/fourth counter values and the fifth/sixth counter values comprise unadjusted system time (UST)/ media stream count (MSC) pairs; and
transmit a second synchronization signal to cause an output buffer in the one or more media devices receiving the plurality of the data frames to skip or repeat one or more data frames transmitted by the one or more media devices based on a difference between the third and fifth counter values for the first and second data frames.

16. The system of claim 15, wherein the first data frame comprises video data.

17. The system of claim 16, wherein the second data frame comprises audio data corresponding to the video data.

18. The system of claim 15, wherein the frontend bus communication interface is configured to receive the third and fourth counter values from the first media device using status direct memory access (SDMA).

19. The system of claim 15, further comprising:
a database system configured to provide the first data frame to the first media device using direct memory access (DMA).

20. The system of claim 15, wherein the first and second data frames comprise portions of an original image.

21. The system of claim 20, wherein the original image is a 4 Kx2160 image segmented into quadrants, the first and second data frames corresponding to two of the quadrants.

22. A method comprising:
determining whether a first counter value, corresponding to a time a first data frame is obtained by a first media device, has been received from the first media device;

determining whether a second counter value, corresponding to a time a second data frame is obtained by a second media device, has been received from the second media device;

wherein the first counter value and the second counter value comprise unadjusted system time (UST);

transmitting a first synchronization signal to one or more of the first and second media devices based on a discrepancy in receipt of the first or second counter value;

receiving, from the first media device, a third counter value corresponding to a time the first data frame is sent for output by the first media device, and a fourth counter value uniquely identifying the first data frame;

receiving, from the second media device, a fifth counter value corresponding to a time the second data frame is sent for output by the second media device, and a sixth counter value uniquely identifying the second data frame, wherein the first and second data frames are intended for synchronized output;

wherein the third/fourth counter values and the fifth/sixth counter values comprise unadjusted system time (UST)/media stream count (MSC) pairs; and transmitting a second synchronization signal to one or more of the first and second media devices based on a difference between the third and fifth counter values for the first and second data frames.

23. A non-transitory, computer-readable storage device having instructions stored thereon, execution of which, by a computing device, causes the computing device to perform operations comprising:

determining whether a first counter value, corresponding to a time a first data frame is obtained by a first media device, has been received from the first media device;

determining whether a second counter value, corresponding to a time a second data frame is obtained by a second media device, has been received from the second media device;

wherein the first counter value and the second counter value comprise unadjusted system time (UST);

transmitting a first synchronization signal to one or more of the first and second media devices based on a discrepancy in receipt of the first or second counter value;

receiving, from the first media device, a third counter value corresponding to a time the first data frame is sent for output by the first media device, and a fourth counter value uniquely identifying the first data frame;

receiving, from the second media device, a fifth counter value corresponding to a time the second data frame is sent for output by the second media device, and a sixth counter value uniquely identifying the second data frame, wherein the first and second data frames are intended for synchronized output;

wherein the third/fourth counter values and the fifth/sixth counter values comprise unadjusted system time (UST)/media stream count (MSC) pairs; and transmitting a second synchronization signal to one or more of the first and second media devices based on a difference between the third and fifth counter values for the first and second data frames.

24. A system comprising:

a front-end bus communication interface configured to:
  determine whether a first counter value, corresponding to a time a first data frame is obtained by a first media device, has been received from the first media device:
  determine whether a second counter value, corresponding to a time the second data frame is obtained by the second media device, has been received from the second media device:
  wherein the first counter value and the second counter value comprise unadjusted system time (UST);
  receive, from the first media device, a third counter value corresponding to a time the first data frame is sent for output by the first media device, and a fourth counter value uniquely identifying the first data frame, and
  receive, from the second media device, a fifth counter value corresponding to a time the second data frame is sent for output by the second media device, and a sixth counter value uniquely identifying the second data frame, wherein the first and second data frames are intended for synchronized output;
  wherein the third/fourth counter values and the fifth/sixth counter values comprise unadjusted system time (UST)/media stream count (MSC) pairs; and a synchronization device, coupled to the front-end bus communication interface, configured to transmit a first synchronization signal to one or more of the first and second media devices based on a discrepancy in receipt of the first or second counter value and transmit a second synchronization signal to one or more of the first and second media devices based on a difference between the third and fifth counter values for the first and second data frames.

* * * * *